United States Patent
Mordukhovich

(10) Patent No.: US 12,463,500 B2
(45) Date of Patent: Nov. 4, 2025

(54) DAMPING RING FOR COAXIAL DUAL PLANETARY SINGLE SPEED ELECTRICAL DRIVE MODULE

(71) Applicant: FCA US LLC, Auburn Hills, MI (US)

(72) Inventor: Gregory Mordukhovich, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 322 days.

(21) Appl. No.: 18/341,812

(22) Filed: Jun. 27, 2023

(65) Prior Publication Data

US 2025/0007352 A1   Jan. 2, 2025

(51) Int. Cl.
*H02K 5/24* (2006.01)
*H02K 7/00* (2006.01)
*H02K 7/116* (2006.01)

(52) U.S. Cl.
CPC .............. *H02K 5/24* (2013.01); *H02K 7/006* (2013.01); *H02K 7/116* (2013.01)

(58) Field of Classification Search
CPC ........... H02K 5/24; H02K 7/006; H02K 7/116
See application file for complete search history.

(56) References Cited

U.S. PATENT DOCUMENTS

| 2014/0256501 A1* | 9/2014 | Willems ................ F16F 15/035 475/331 |
| 2016/0001625 A1* | 1/2016 | Wolf ...................... B60G 13/00 188/266.1 |

FOREIGN PATENT DOCUMENTS

KR    101111546 B1   2/2012

* cited by examiner

*Primary Examiner* — Naishadh N Desai
(74) *Attorney, Agent, or Firm* — Jeremy J. Klobucar

(57) ABSTRACT

An electric drive module (EDM) that generates and transfers drive torque to a driveline of an electrified vehicle is provided. The EDM includes an electric drive gearbox assembly having a housing, first and second planetary gear sets, and a damper. The housing defines a first and second pockets and an annular channel formed intermediate an outer wall of the housing and a ring gear support inner wall. The first planetary gear set is disposed in the first pocket and has a first ring gear splined to the ring gear support inner wall. The damper is disposed in the annular channel and has an inboard surface that engages a damper engaging surface on the ring gear support inner wall and an outboard surface that engages the housing outer wall. The damper mitigates noise vibration and harshness (NVH) of the electric drive gearbox assembly.

20 Claims, 2 Drawing Sheets

DAMPING RING FOR COAXIAL DUAL PLANETARY SINGLE SPEED ELECTRICAL DRIVE MODULE

FIELD

The present application generally to electrified vehicles and, more particularly, to a damping ring for a coaxial dual planetary single speed electrical drive module.

BACKGROUND

An electrified vehicle (hybrid electric, plug-in hybrid electric, range-extended electric, battery electric, etc.) includes at least one battery system and at least one electronic drive module having an electric motor and associated electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. The electric drive gearbox assembly can be configured in many ways to achieve various gear ratios. One such configuration includes a dual planetary coaxial assembly. In some examples however it may be challenging to minimize noise vibration and harshness (NVH) associated with such configurations. A proposed solution to NVH in such an electric drive gearbox assembly includes implementing an NVH cover or blanket that surrounds the electric drive gearbox assembly. Such blankets however are expensive and can promote other disadvantages such as elevated temperatures. Accordingly, while such electronic drive modules do work well for their intended purpose, there is a desire for improvement in the relevant art.

SUMMARY

According to one example aspect of the invention, an electric drive module (EDM) that generates and transfers drive torque to a driveline of an electrified vehicle is provided. The EDM includes an electric drive gearbox assembly having a housing, a first planetary gear set, a second planetary gear set and a damper. The housing defines a first pocket, a second pocket and an annular channel formed intermediate an outer wall of the housing and a ring gear support inner wall. The first planetary gear set is disposed in the first pocket and has a first ring gear splined to the ring gear support inner wall. The second planetary gear set is disposed in the second pocket and has a second ring gear splined to the outer wall of the housing. The damper is disposed in the annular channel and has an inboard surface that engages a damper engaging surface on the ring gear support inner wall and an outboard surface that engages the housing outer wall. The damper mitigates noise vibration and harshness (NVH) of the electric drive gearbox assembly.

In some implementations, the damper is press-fit within the annular channel. A mechanical connection can retain the damper to the housing at the annular channel. The mechanical connection can include a snap-ring. In additional implementations, the mechanical connection can additionally or alternatively include a fastener.

In some implementations, the inboard surface of the damper is tapered to complement the damper engaging surface. In additional examples, the outer surface of the damper is tapered. The damper is formed of elastomeric material.

In some implementations, the electric drive module can further include an input shaft that drives the first planetary gear set. The first planetary gear set further comprises first pinion gears and a first sun gear, the first planetary gear set operates as an input planetary gear set.

In some implementations, the second planetary gear set further comprises second pinion gears and a second sun gear. The second planetary gear set operates as an output planetary gear set.

In additional aspects, a first carrier supports the first planetary gear set. The first sun gear is an input that outputs rotational motion to the first carrier.

In additional features, a second carrier supports the second planetary gear set. The second sun gear is coupled to the first carrier. In examples, the housing is formed of aluminum. The electric drive module can additionally include an electric motor powered by a high voltage battery system. The damper has a first height that extends greater than a second height of the first ring gear.

According to another example aspect of the invention, an electric drive module (EDM) that generates and transfers drive torque to a driveline of an electrified vehicle is provided. The EDM includes an electric drive gearbox assembly having a housing, a first planetary gear set, a second planetary gear set and a damper. The housing has a ring gear support inner wall and an outer wall. The ring gear support inner wall has a ring engaging surface and a damper engaging surface. The housing defines an annular cavity between the damper engaging surface and the outer wall. The first planetary gear set is disposed in the housing and has a first ring gear splined to the ring engaging surface. The second planetary gear set is disposed in the housing and has a second ring gear splined to the outer wall. The damper is press-fit into the annular channel. The damper has an inboard surface that engages the damper engaging surface on the ring gear support inner wall and an outboard surface the engages the housing outer wall. The damper mitigates noise vibration and harshness (NVH) of the electric drive gearbox assembly.

In additional aspects, the damper has a first height that extends greater than a second height of the first ring gear. The electric drive module can additionally include a mechanical connection that retains the damper to the housing at the annular channel. The mechanical connection can include at least one of a snap-ring and a fastener. In examples, the damper is formed of elastomeric material.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, one electric drive gearbox assembly used in electronic drive modules (EDM's) includes a dual planetary coaxial assembly. The dual planetary coaxial assembly can be used in EDM's where packaging constrains may exist. Historically, dual planetary coaxial assemblies have not been used in electronic drive modules as it has been challenging to minimize noise vibration and harshness (NVH) associated with such configurations. In particular, electronic drive modules incorporating dual planetary coaxial assemblies have two ring gears associated with both of the planetary assemblies splined into a housing of the gearbox assembly.

The direct splining of two ring gears (in particular a ring gear associated with a high rate of speed planetary assembly) into the housing can promote unwanted NVH experienced by a vehicle occupant at the housing and the electronic drive module as a whole. Explained further, a direct noise path of the electric drive gearbox assembly is taken from the ring gears, through the housing and to the vehicle occupant. The instant electric drive gearbox assembly incorporates a damping ring disposed between a ring gear case support wall and the outer wall of the housing. The damping ring is a cost effective and easily assembled solution that mitigates NVH in such dual planetary coaxial assemblies used in electronic drive module applications in vehicles.

Figure 1:
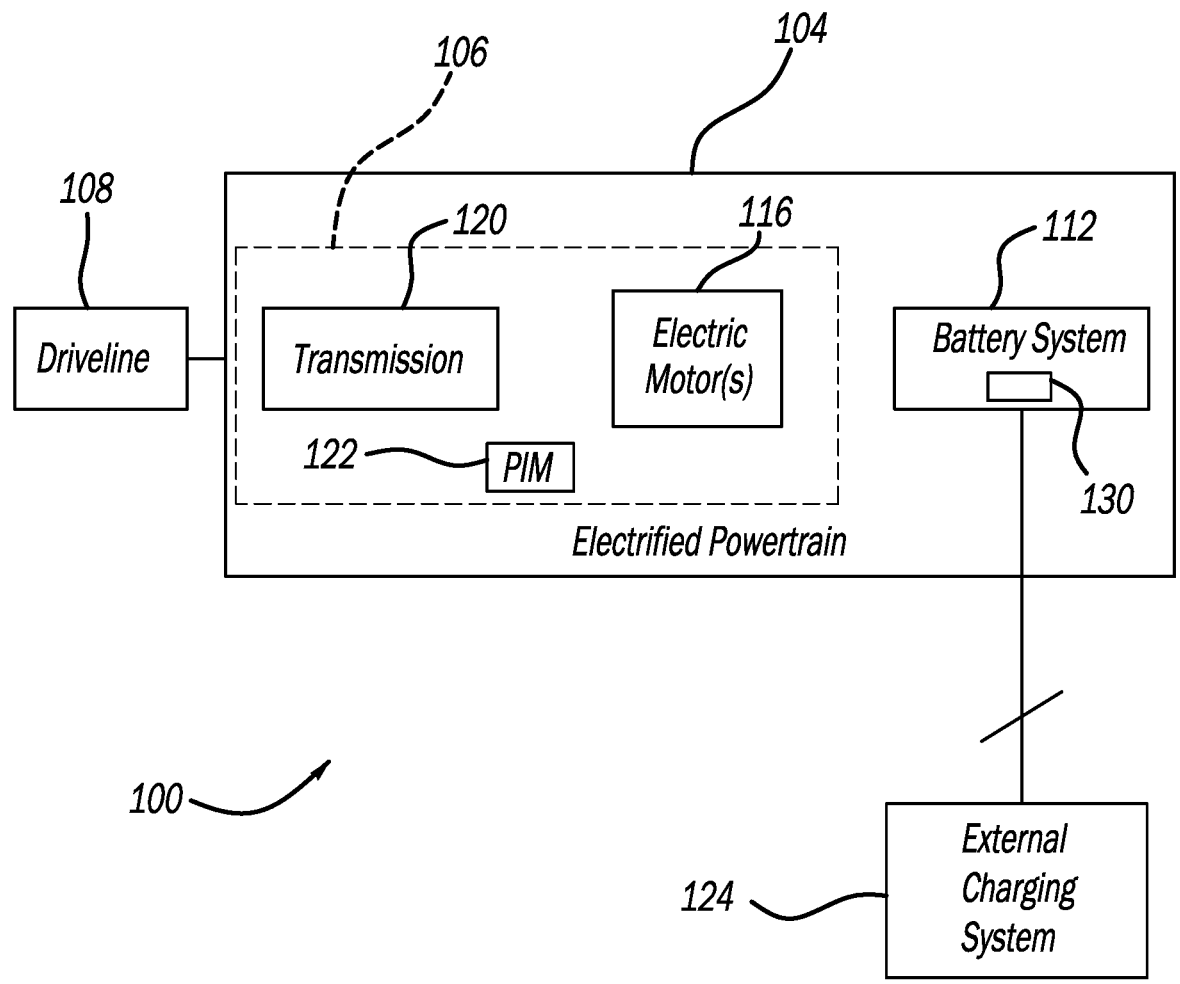
FIG. 1 is a functional block diagram of an electrified vehicle having an electronic drive module including an electric drive gearbox that incorporates a damping ring according to the principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 for vehicle propulsion. The EDM 106 generally includes one or more electric drive units or motors 116 (e.g., electric traction motors), an electric drive gearbox assembly or transmission 120, and power electronics including a power inverter module (PIM) 122.

The electric motor 114 is selectively connectable via the PIM 124 to a high voltage battery system 112 for powering the electric motor 116. The battery system 112 is selectively connectable (e.g., by the driver) to an external charging system 124 (also referred to herein as "charger 124") for charging of the battery system 112. The battery system 112 includes at least one battery pack assembly 130.

Figure 2:
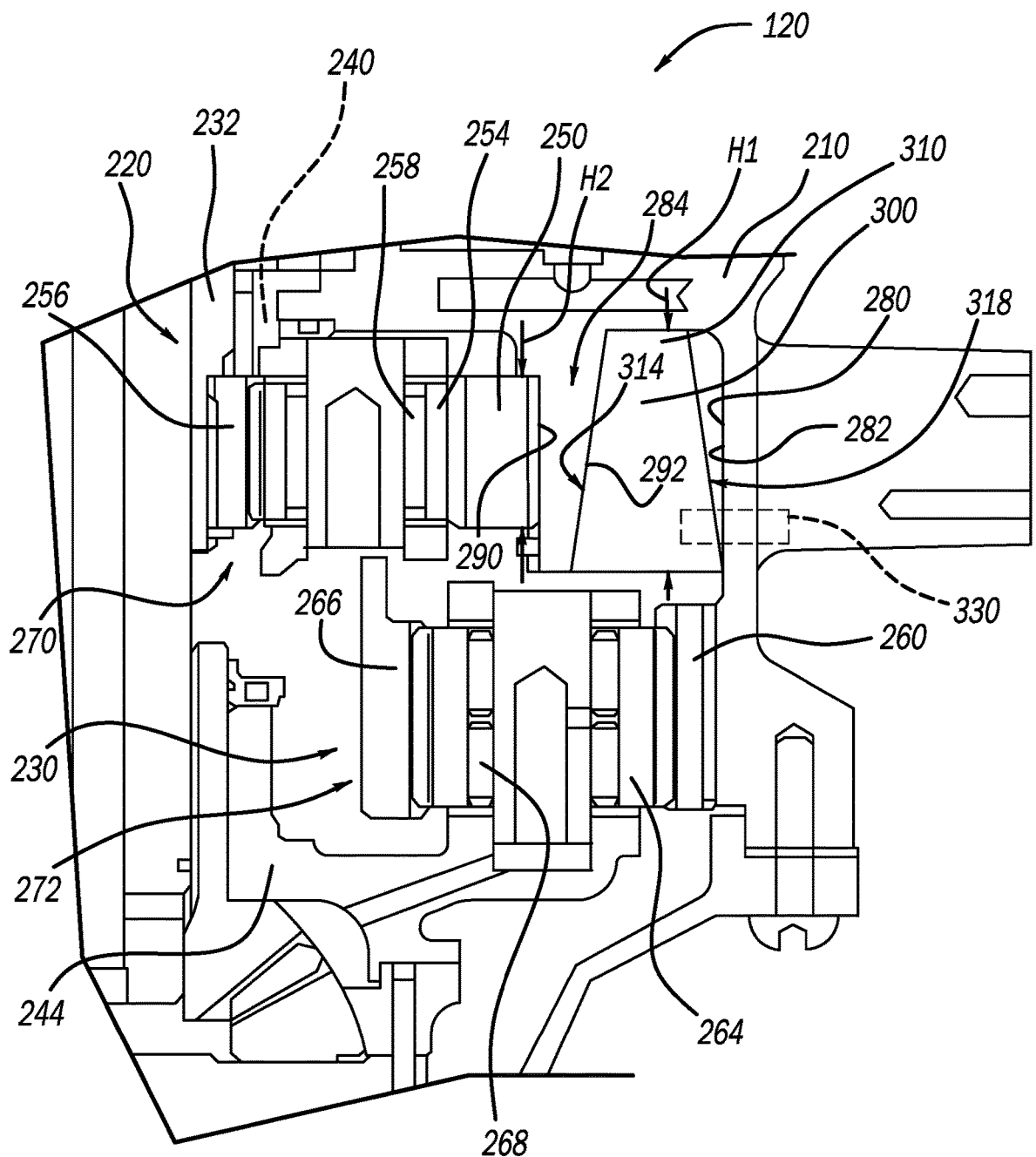
FIG. 2 is cross-sectional view of the electric drive gearbox of FIG. 1.

With additional reference now to FIG. 2, additional features of the electric drive gearbox assembly 120 of the EDM 106 will be described. The electric drive gearbox assembly 120 generally includes a case or housing 210 that houses a first planetary gear set 220 and a second planetary gear set 230. In the example shown, the first planetary gear set 220 is an input planetary gear set driven by an input shaft 232. The first planetary gear set 220 can be associated with a first carrier 240. The second planetary gear set 230 can be associated with a second carrier 244.

The first planetary gear set 220 includes a first ring gear 250, a collection of planet or first pinion gears 254 and a first sun gear 256. The first pinion gears 254 can be rotatably supported by first needle bearings 258. The second planetary gear set 230 includes a second ring gear 260, a collection of planet or second pinion gears 264 and a second sun gear 266. The second pinion gears 264 can be rotatably supported by second needle bearings 268. In the example shown, the second planetary gear set 230 is an output planetary gear set. The first carrier 240 can be configured to hold the first pinion gears 254. Similarly, the second carrier 244 can be configured to hold the second pinion gears 264.

During operation, the first sun gear 256 acts as an input that outputs to the first carrier 240. The first carrier 240 is coupled to the second sun gear 266. The second sun gear 266 acts as an input that outputs to the second carrier 244. The first and second ring gears 250 and 260 are stationary relative to the housing 210.

The housing 210 can generally define a first pocket 270 that receives the first planetary gear set 220, and a second pocket 272 that receives the second planetary gear set 230. As used herein, the term "pocket" is meant to generally denote an open space within the housing 210 and does not imply any particular shape. The housing 210 further defines an annular channel 280 formed intermediate a housing outer wall 282 and a ring gear support inner wall 284. In this regard, the first pocket 270 and the annular channel 280 can generally be separated by the ring gear support inner wall 284. The ring gear support inner wall 284 can have a ring engaging surface 290 and a damper engaging surface 292. Preferably, the first ring gear 250 has a maximum contact surface area with the ring engaging surface 290 to fill the ring engaging surface 290 and occupy a maximum available volume of the first housing pocket 270. In examples, the housing 210 can be formed of lightweight material such as aluminum.

According to the present disclosure, the electric drive gearbox assembly 120 incorporates a damper 300 in the annular channel 280. The damper 300 can be formed of any damping material such as an elastomeric material. In an installed position (FIG. 2), the damper 300 can generally engage the damper engaging surface 292 and the housing outer wall 282 to fill or substantially fill the annular channel 280. The damper 300 can generally include a damper body 310 in the form of a ring having an inboard surface 314 and an outboard surface 318. In examples, the damper 300 has a height H1 that extends greater than a height H2 of the first ring gear 250 further improving NVH mitigation.

The inboard surface 314 can be tapered to match a profile of the damper engaging surface 292 of the housing 210. The outboard surface 318 can also be tapered, or have other profiles for engaging the housing outer wall 282 of the housing 210. The damper 300 is configured to mitigate NVH transmitted from the first planetary gear set 220 through the housing 210 and ultimately to a vehicle occupant. In particular, as the damper 300 engages the damper engaging surface 292 and the outer wall 282 of the housing, NVH that may otherwise be transmitted through the first ring gear 250 resulting from operation of the first planetary gear set 220 is dampened.

In examples, the damper 300 can be press-fit into the annular channel 280 of the housing 210. Additionally or alternatively, the damper 300 can be retained or fixed into the annular channel 280 by way of mechanical connection 330. The mechanical connection 330 can include at least one of a snap-ring, and one or more fasteners.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electric drive module that generates and transfers drive torque to a driveline of an electrified vehicle, the electric drive module comprising:
 an electric drive gearbox assembly comprising:
  a housing defining a first pocket, a second pocket and an annular channel, the annular channel formed intermediate an outer wall of the housing and a ring gear support inner wall;
  a first planetary gear set disposed in the first pocket and having a first ring gear splined to the ring gear support inner wall;
  a second planetary gear set disposed in the second pocket and having a second ring gear splined to the outer wall of the housing; and
  a damper disposed in the annular channel, the damper having an inboard surface that engages a damper engaging surface on the ring gear support inner wall and an outboard surface that engages the housing outer wall, the damper mitigating noise vibration and harshness (NVH) of the electric drive gearbox assembly.

2. The electric drive module of claim 1, wherein the damper is press-fit within the annular channel.

3. The electric drive module of claim 1, further comprising a mechanical connection that retains the damper to the housing at the annular channel.

4. The electric drive module of claim 3, wherein the mechanical connection comprises a snap-ring.

5. The electric drive module of claim 3, wherein the mechanical connection comprises a fastener.

6. The electric drive module of claim 1, wherein the inboard surface of the damper is tapered to complement the damper engaging surface.

7. The electric drive module of claim 6, wherein the outer surface of the damper is tapered.

8. The electric drive module of claim 1, wherein the damper is formed of elastomeric material.

9. The electric drive module of claim 1, further comprising an input shaft that drives the first planetary gear set, the first planetary gear set further comprising first pinion gears and a first sun gear, the first planetary gear set operating as an input planetary gear set.

10. The electric drive module of claim 9, wherein the second planetary gear set further comprising second pinion gears and a second sun gear, the second planetary gear set operating as an output planetary gear set.

11. The electric drive module of claim 10, further comprising a first carrier that supports the first planetary gear set, wherein the first sun gear is an input that outputs rotational motion to the first carrier.

12. The electric drive module of claim 11, further comprising a second carrier that supports the second planetary gear set, wherein the second sun gear is coupled to the first carrier.

13. The electric drive module of claim 1, wherein the housing is formed of aluminum.

14. The electric drive module of claim 1, further comprising an electric motor powered by a high voltage battery system.

15. The electric drive module of claim 1, wherein the damper has a first height that extends greater than a second height of the first ring gear.

16. An electric drive module that generates and transfers drive torque to a driveline of an electrified vehicle, the electric drive module comprising:
 an electric drive gearbox assembly comprising:
  a housing having a ring gear support inner wall and an outer wall, the ring gear support inner wall having a ring engaging surface and a damper engaging surface, the housing defining an annular cavity between the damper engaging surface and the outer wall;
  a first planetary gear set disposed in the housing and having a first ring gear splined to the ring engaging surface;
  a second planetary gear set disposed in the housing and having a second ring gear splined to the outer wall; and
  a damper press-fit into the annular channel, the damper having an inboard surface that engages the damper engaging surface on the ring gear support inner wall and an outboard surface that engages the housing outer wall, the damper mitigating noise vibration and harshness (NVH) of the electric drive gearbox assembly.

17. The electric drive module of claim 16, wherein the damper has a first height that extends greater than a second height of the first ring gear.

18. The electric drive module of claim 17, further comprising a mechanical connection that retains the damper to the housing at the annular channel.

19. The electric drive module of claim 18, wherein the mechanical connection comprises at least one of a snap-ring and a fastener.

20. The electric drive module of claim 16, wherein the damper is formed of elastomeric material.

* * * * *